Nov. 10, 1936.  J. B. ROSEFIELD  2,060,245
INSECT POISON CONTAINER
Filed July 29, 1933

INVENTOR.
JOHN B. ROSEFIELD
BY Jas. M. Naylor
ATTORNEY

Patented Nov. 10, 1936

2,060,245

UNITED STATES PATENT OFFICE 2,060,245

INSECT POISON CONTAINER

John B. Rosefield, Oakland, Calif.

Application July 29, 1933, Serial No. 682,859

7 Claims. (Cl. 43—131)

This invention relates to insect poison containers of the type which are set out in insect infested areas and which permit ready access to the poisonous contents.

More particularly it relates to insect poison containers of the type which are provided with small openings through which the insect may freely pass to partake of the contents and make his exit carrying the poison back to the nest.

It should be understood that in the extermination of insects, and ants particularly, it is necessary to employ a slow-acting poison, having properties attractive to the ant, and which can be collected by the worker ant for delivery to the ants in the nests so that the extermination begins at the source of the trouble, in contradistinction to the killing of a few roving worker ants by a quick-acting poison.

In setting out containers of this poison care has to be exercised that the container is of the type which precludes any possibility of small children or pet animals coming into contact with the contents and yet permits free access thereto by the insects for which it is intended, at the same time bearing in mind that the devices of this character should be of simple construction, inexpensive to manufacture and easy to clean.

Those devices with which I am familiar do not accomplish all of these objectives, that is, no single one of the prior devices embodies all of these virtues, and it was with this thought in mind that the present invention was perfected.

Other objects and advantages will become apparent as the specification proceeds and the novelty of my device will be particularly pointed out in the appended claims.

Figure 1:
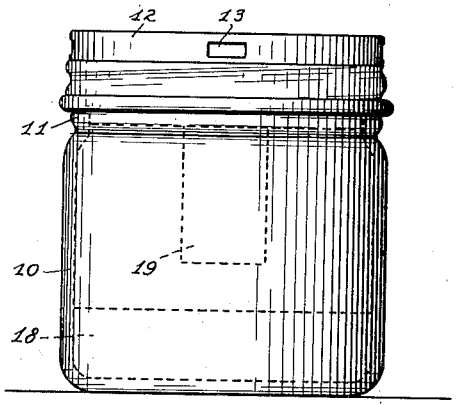
Figure 1 is an elevation of one of the containers embodying the subject matter of this invention.

The numeral 10 designates the common glass jar having a threaded neck 11 and a screw cap 12. This cap, it should be noted, is of a special construction and forms the subject matter of United States Letters Patent No. 1,703,210, granted to me on February 26, 1929. It is provided with a series of ports 13, formed by making a cross-cut, like the letter X, within a rectangle and then bending the four triangles 14, 15, 16, and 17 thus formed inwardly along their bases. These ports are circumferentially disposed between the extreme top of the cap 12 and its uppermost thread. (See Figure 2). Thus the triangle 17, nearest the threads in the cap, acts as a stop and rests upon the top of the jar 10, preventing the cap from being screwed down on the latter far enough to close the ports 13.

Within the jar or container 10, I provide a plug 18 having a pipe 19 extending therethrough. The top of the pipe is flush with the top of the plug, as will be noted in Figure 2, and the opposite end projects into the jar for about half of the depth of the latter. The plug and pipe are removable as a unit from the jar for the purpose of cleaning the latter, by inserting a bent nail or any hooked tool into the pipe and pulling outwardly. To facilitate this and to prevent the pipe 19 from being pulled through the plug, I have provided a shoulder 20 on the pipe 19 which bears against the plug 18.

Figure 2:
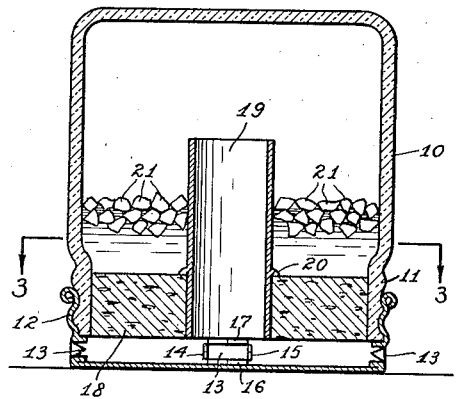
Figure 2 is a cross-section of the container shown in Figure 1, in its inverted position.
Figure 3:
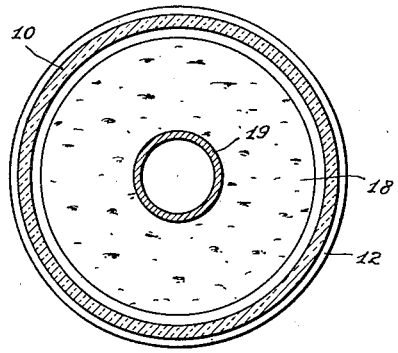
Figure 3 is a section taken along the line 3—3 of Figure 2.

The container forming the subject matter of this invention is designed for use in the inverted position shown in Figure 2, although it may be used in the position shown in Figure 1. When thus set out, the ant finds a point of entry at the level on which it is crawling instead of having to climb the sides of container in search of a way of getting at the contents.

It will be noted that but a small quantity of the liquid poison is placed in the container, this being for the reason that in inverting the container, spilling of the poison should be avoided. It is obvious that so long as the level indicated is maintained in relation to the length of the pipe, the liquid will flow to the lowest part of the container, while the latter is being inverted and run down into the position shown in Figure 2 rather than flow outwardly through the pipe 19. Furthermore, this construction precludes the possibility of spilling should the container be accidentally tipped after being set.

Segments of cork or other buoyant material 21 are placed on the surface of the poison so that the ant or other insect may crawl down the side of the pipe 19 and onto the former to partake of the poison, without danger of falling into the liquid which would defeat the very purpose of this method of extermination.

Figure 4:
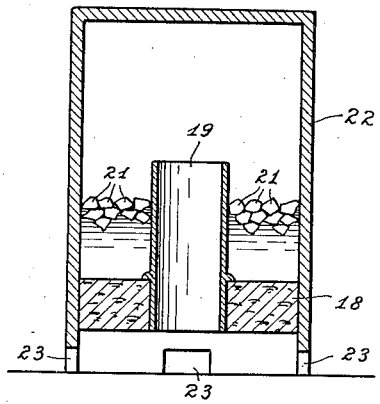
Figure 4 is a section of a modification of the structure shown in Figure 2.

The modification shown in Figure 4 differs from the principal structure in that an all-metal container 22 is provided with ports 23 formed near its upper edge by making the notches or cut-outs 23. In this application of the principle, the plug 18 forms the only closure for the container and is provided with the pipe 19 as in the case of the preferred form of the invention. When not in use a small cork or plug (not shown) is inserted in the outer end of the pipe 19.

In operation the devices shown are employed as follows: An ant crawling along the surfaces shown in Figures 2 and 4, enters the ports 13 or 23, whereupon it finds itself in a small chamber flooded with the scent of the material to which it is attracted. It crawls upwardly in the pipe 19 and, emerging within the container, down the outside of the pipe to the segments 21, floating on the surface of the poison. While standing on these segments the ant takes up a quantity of the poison and retraces its steps, passing through the ports to return to the nest or hill to deliver its load to the baby ants for consumption.

It will be noted that I have provided a device which may be used in two positions, namely, those shown in Figures 1 and 2 of the drawing. The principal structure shown in Figure 1, when used in the position shown in Figure 2, would avoid the possibility of rain water or water from a garden hose entering the container proper and diluting the contents, a problem which the prior devices do not seem to take into consideration.

Furthermore, it is also obvious that it would be impossible for children to open my container out of curiosity and come in contact with the poison as is the case with other containers employing only a screw-cap closure. In my case it is necessary to use a bent nail or special tool to remove the inner closure, a problem with which the average child could not cope.

Having thus described my invention, what I claim and desire to secure by grant of Letters Patent, is:

1. An insect poison container comprising a receptacle having a screwthreaded neck portion, a screw cap for said receptacle, ports in the side walls of said cap, stops in said cap adjacent said ports to prevent said cap from being turned on said receptacle to close said ports, an inner closure for said receptacle having an aperture therein, and a pipe in said aperture extending into said receptacle.

2. An insect poison container comprising a receptacle having a screwthreaded neck portion, a screw cap for said receptacle of greater depth than the screwthreaded neck portion of said receptacle, ports in the side walls of said cap between the top thereof and the mouth of said receptacle, an inner closure for said receptacle set flush with the mouth thereof and having an aperture therein, and a pipe extending through the aperture in said inner closure and into said receptacle.

3. An insect poison container comprising a receptacle having a screwthreaded neck portion, a screw cap for said receptacle of greater depth than the screwthreaded neck portion of said receptacle, ports in the side walls of said cap between the top thereof and the mouth of said receptacle, an inner closure for said receptacle set flush with the mouth thereof and having an aperture therein, a pipe extending through the aperture in said inner closure and into said receptacle with its intake end set flush with the top of said inner closure, and a shoulder on said pipe engaging the inner side of said inner closure.

4. An insect poison container comprising a receptacle having a screwthreaded neck portion, a screw cap for said receptacle, of greater depth than said threaded neck portion of said receptacle, ports in the side walls of said cap, an inner closure for said receptacle held in spaced relation to said cap to form a chamber at the mouth of said receptacle, an aperture in said inner closure, and a pipe extending through the aperture in said inner closure and into said receptacle.

5. In an insect poison container comprising a receptacle having a screwthreaded neck portion, a screw cap for said receptacle of greater depth than said threaded neck portion of said receptacle, ports in the side walls of said cap, an inner closure for said receptacle held in spaced relation to said cap to form a chamber at the mouth of said receptacle, an aperture in said inner closure, a pipe extending through the aperture in said inner closure and into said receptacle, and segments of a buoyant material within said receptacle adapted to float upon the surface of a liquid contained thereby and to abut the walls of said pipe.

6. In an insect poison container, a receptacle, a plug in said receptacle seated below the mouth thereof, an aperture in said plug, a pipe in said aperture having one end flush with the outer face of said plug and the other end extending into said receptacle, and a shoulder on said pipe abutting the inner face of said plug.

7. An accessory for use in insect poison containers comprising, a plug adapted to be seated below the mouth of the receptacle, an aperture in said plug, a pipe in said aperture having one end flush with the outer face of said plug and the other end adapted to extend into the receptacle, and a shoulder on said pipe abutting the inner face of said plug.

JOHN B. ROSEFIELD.